Dec. 28, 1943.  C. G. PULLIN  2,337,571
ROTARY WING AIRCRAFT
Filed May 25, 1940   7 Sheets-Sheet 2

INVENTOR
Cyril George Pullin
ATTORNEYS
Synnestvedt & Lechner

Dec. 28, 1943.    C. G. PULLIN    2,337,571
ROTARY WING AIRCRAFT
Filed May 25, 1940    7 Sheets-Sheet 3

INVENTOR
Cyril George Pullin
ATTORNEYS
Synnestvedt + Lechner

Dec. 28, 1943. C. G. PULLIN 2,337,571
ROTARY WING AIRCRAFT
Filed May 25, 1940 7 Sheets-Sheet 4

INVENTOR
Cyril George Pullin
ATTORNEYS
Synnestvedt & Lechner

Dec. 28, 1943.  C. G. PULLIN  2,337,571
ROTARY WING AIRCRAFT
Filed May 25, 1940  7 Sheets-Sheet 5

INVENTOR
Cyril George Pullin
ATTORNEYS
Synnestvedt & Lechner

Dec. 28, 1943.     C. G. PULLIN     2,337,571
ROTARY WING AIRCRAFT
Filed May 25, 1940     7 Sheets-Sheet 6

Fig. 7.

INVENTOR
Cyril George Pullin
ATTORNEYS
Symmestvedt + Lechner

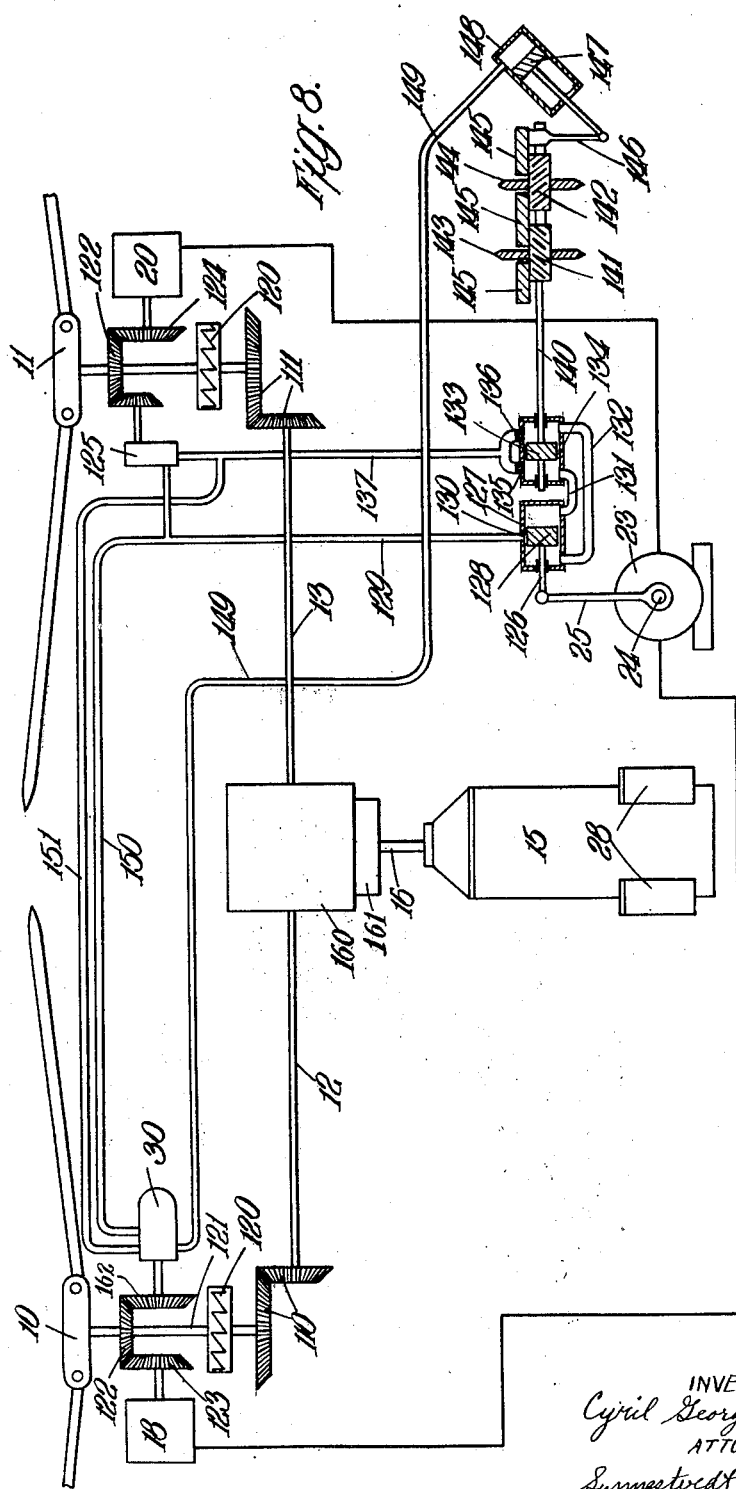

Patented Dec. 28, 1943

2,337,571

UNITED STATES PATENT OFFICE 2,337,571

ROTARY WING AIRCRAFT

Cyril George Pullin, Genista, Newton Mearns, Scotland, assignor to Autogiro Company of America, Willow Grove, Pa., a corporation of Delaware Application May 25, 1940, Serial No. 337,169
In Great Britain March 9, 1939

29 Claims. (Cl. 244—17)

The present invention relates to rotative wing aircraft and more particularly to means for preventing the setting up of dangerous flight conditions of the aircraft.

According to the present invention an aircraft having a pair of sustaining rotors, or a sustaining rotor and a propulsive airscrew, is provided with electric generators responsive to the speed of each such rotor and airscrew connected to means which respond to any difference between the outputs of the generators, operative to change the pitch angles of the blades of the rotor or rotors and/or airscrew or to stop the power unit.

A feature of this invention consists in using alternating current electric generators connected to means responsive to any difference between the frequencies of the outputs of the generators. In the case of an aircraft having a pair of sustaining rotors the frequency responsive means may be arranged to operate through a fluid pressure system to alter the pitches of the rotors in opposite senses to maintain equality of speed of the rotors. In the case of an aircraft having a sustaining rotor and a propulsive airscrew offset from the longitudinal axis of the aircraft, the frequency responsive means operate in a similar manner to maintain constant the ratio of the speed of the airscrew to that of the rotor. Alternatively the frequency responsive means may be arranged to stop the power unit in the event of an excessive difference in speed between the two rotors and be associated with means for causing the rotor blades to assume pitch angles in which the rotors are capable of autorotation on the failure of the drive.

The accompanying drawings illustrate diagrammatically various arrangements in accordance with this invention as applied to aircraft having a pair of sustaining rotors disposed on either side of the longitudinal axis and also to aircraft having a single sustaining rotor and an airscrew offset from the longitudinal axis of the aircraft by an amount such that the airscrew thrust moment counteracts the torque reaction of the rotor.

In the drawings:

Fig. 7 is a diagrammatic elevational view showing this invention applied to an aircraft having a single sustaining rotor and an offset airscrew;

Fig. 8 is a diagrammatic view similar to Fig. 5 showing the application of the control system of Fig. 5 to a gyroplane.

Figure 1:
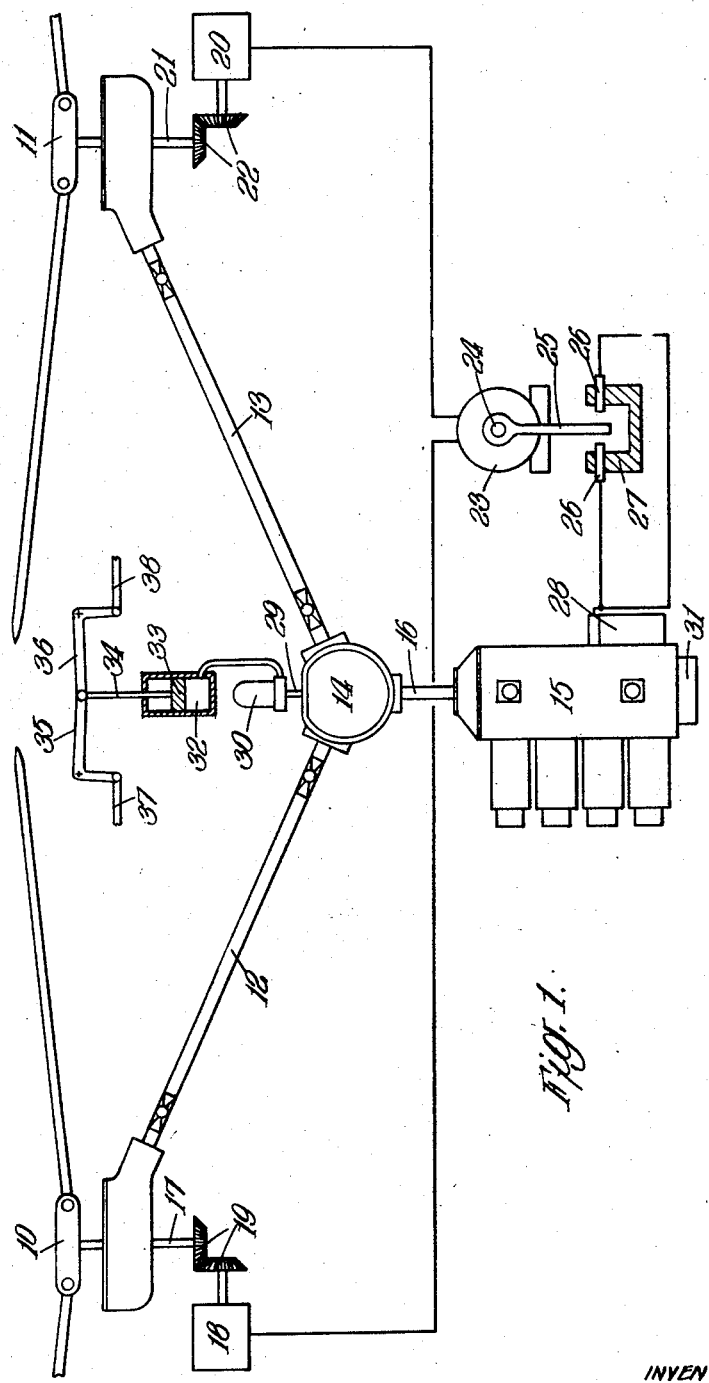
Fig. 1 is a diagrammatic elevational view showing the application of this invention to an aircraft having a pair of normally power driven sustaining rotors and in which excessive difference in the rotor speeds causes stopping of the power unit.

Referring to Fig. 1. An aircraft has a pair of sustaining rotors 10, 11 which are driven respectively through shafts 12 and 13 from a differential balance gear 14 on the centre line of the aircraft. The differential balance gear 14 is driven from a power unit 15 through a shaft 16 and is arranged to ensure substantial equality of the torque applied from the power unit to the two rotors. The hub of the rotor 10 has a downwardly extending shaft 17 from which an alternating current generator 18 is driven by a bevel drive 19. The rotor 11 has a similar generator 20 driven from a shaft 21 through a bevel drive 22.

The outputs from the alternating current generators 18 and 20 are brought to a differential electrical unit 23 which is sensitive to a difference in the frequency of the two outputs. In the event of the difference becoming excessive, the spindle 24 of the differential electrical unit 23 turns, carrying with it the arm 25 which is adapted to make contact with one of a pair of contacts 26 mounted on an insulating base 27. The contacts 26 are connected to the low tension circuit of the magneto 28 of the power unit 15 so that when the arm 25 makes contact with either of the contacts 26 the primary of the magneto is short circuited, thus stopping the power unit, thereby preventing any tendency for the difference in speed of the rotors to increase to an unsafe value which might cause overturning of the aircraft.

Driven from a shaft 29 extending upwardly from the differential balance gear 14 is a governor unit 30, hereafter described in detail with reference to Fig. 3, and which controls the admission of pressure fluid from a pump 31 mounted on the power unit to a relay cylinder 32 having a piston 33. An upwardly extending piston rod 34 is pivotally connected at its upper end to a pair of bell cranks 35 and 36 coupled by rods 37 and 38 respectively to the pitch controls (not shown) of the rotors 10 and 11 respectively.

In the event of failure of the power unit or stopping of the latter by the action of the differential electrical unit 23, the speed of the power unit shaft 16 decreases, affecting the governor unit 30 which reduces the fluid pressure within the cylinder 32 causing the piston and piston rod 33 and 34 to move downward thereby moving outward the rods 37 and 38. These rods are coupled to the pitch controls of the rotors in such a way that this movement causes the pitches of both rotors to be reduced to a value within the autorotational range so that the aircraft may be landed safely.

Figure 2:
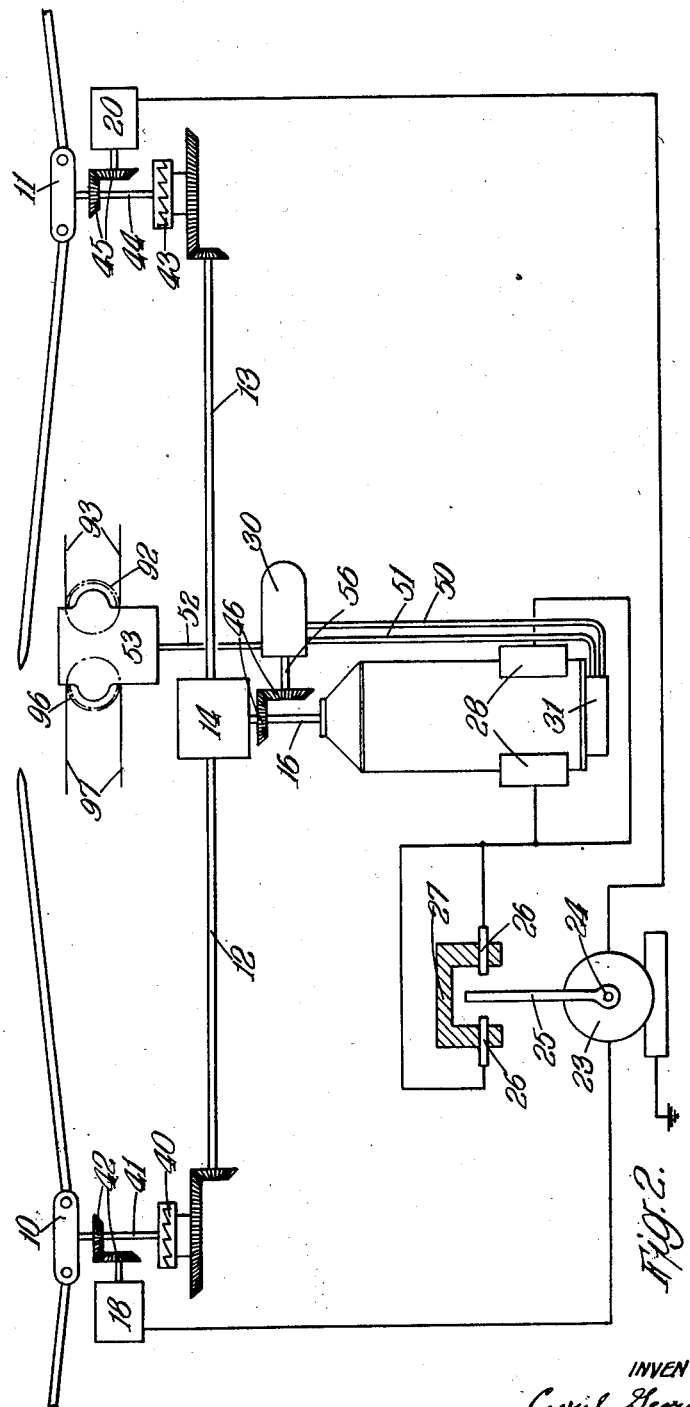
Fig. 2 shows a modification.

The arrangement illustrated in Fig. 2 is somewhat similar to that illustrated in Fig. 1 but in this case the rotor 10 has a freewheel clutch 40 interposed between the shaft 12 and the hub of the rotor to which it is connected by a shaft 41. A suitable construction of rotor hub is described and claimed in my copending applications Serial No. 331,318, and Serial No. 337,381, which latter has issued at Patent 2,330,842. The alternating current electric generator 18 is driven from the shaft 41 by a bevel drive 42. Similarly the rotor 11 has a freewheel clutch 43 connected by a shaft 44 to the rotor hub while the generator 20 is driven from the shaft 44 through a bevel drive 45. The governor unit 30 is driven from the shaft 16 of the power unit by a bevel drive 46 so that it is responsive to the speed of the power unit. The governor unit is connected by a pipe 50 to the pressure side of a fluid pump 31 mounted on the power unit and by a pipe 51 to the return side of said pump. The governor unit is connected by a pipe 52 to a pitch control unit 53 which alters the pitches of the rotors according to the fluid pressure within it which is controlled by the governor unit. The construction of the pitch control unit is illustrated in Fig. 4.

Figure 3:
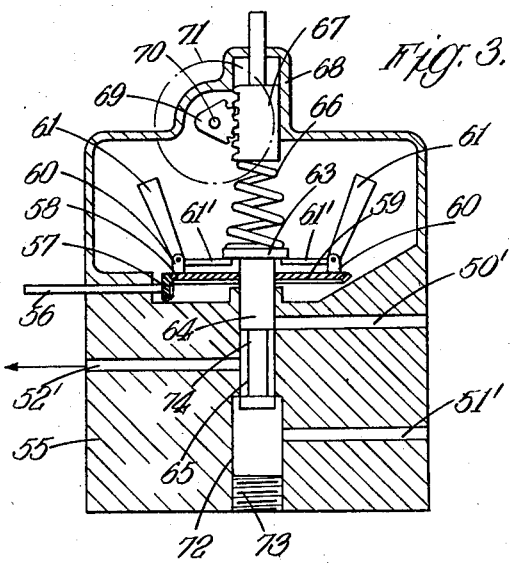
Fig. 3 is a diagrammatic sectional view of a governor unit shown in Figs. 1 and 2.

Fig. 3 shows diagrammatically the construction of the governor unit which comprises a casing 55 through which passes a shaft 56 having at its inner end a bevel pinion 57 engaging a bevel wheel 58 secured to a plate 59 having a pair of lugs 60 on its upper surface and to which are pivotally secured a pair of governor weights 61. Each governor weight has an inward extension 61' which lies under a collar 63 at the upper end of a piston valve rod 64 which is vertically slidable in a bore 65 in the casing 55. The piston valve rod 64 is urged downwardly by a compression coil spring 66, the lower end of which abuts against the collar 63 while the upper end abuts against a rack member 67 which is vertically slidable in guides 68 formed within the upper part of the casing. The rack of the rack member is engaged by a toothed sector 69 carried by a shaft 70 on which is mounted a wheel 71 coupled to a pilot's control for adjusting the equilibrium speed of the governor unit. Communicating with the upper part of the bore 65 is a duct 50' which is a continuation of the pipe 50 from the pressure side of the fluid pump 31. A duct 51' communicates with an enlargement 72 at the lower end of the bore 65 which is closed by a screwed plug 73. The piston valve rod 65 has a part of reduced diameter 74 which, when the governor unit is in the equilibrium condition, occupies the position shown in Fig. 3. In this position the space surrounding the reduced part 74 of the piston rod, which is always in communication with a duct 52' which is continued as the pipe 52, is not connected to either the pressure or the return side of the pump 31. If, however, the speed of the power unit shaft 16 increases, the governor unit driven through the bevel drive 46 and the shaft 56 is driven more quickly, causing the governor weights 61 to move outwardly so that their inward extensions 61' move the collar 63 upwardly against the action of the spring 66, thereby moving the piston valve rod 64 upwardly to a position in which the duct 50' is put into communication with the duct 52', allowing pressure fluid to pass to the pitch control unit. Conversely, should the speed of the power unit shaft 16 be reduced, the governor weights 61 move inwardly, allowing the piston valve rod 63 to move downwardly to a position in which the duct 52' is put into communication with the duct 51', permitting fluid under pressure to return from the pitch control unit to the suction side of the pump 31.

Figure 4:
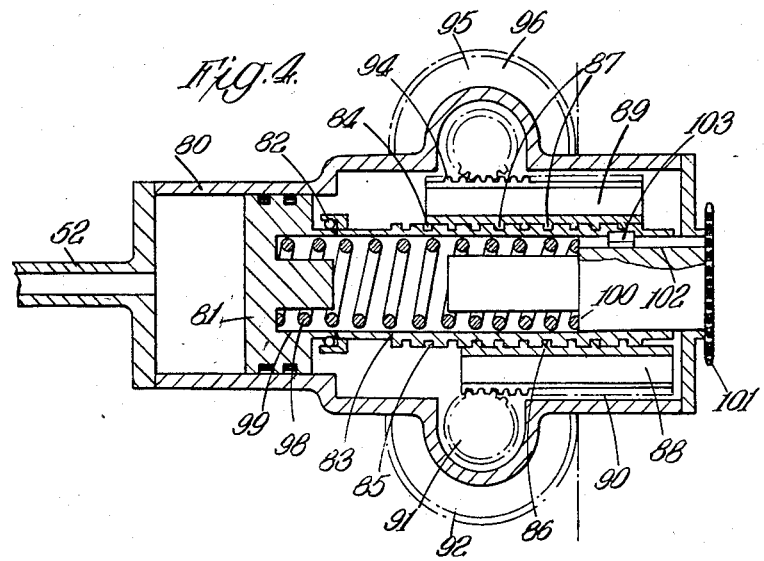
Fig. 4 is a diagrammatic sectional view of a pitch change unit shown in Fig. 2.

The pitch control unit is illustrated in Fig. 4. It comprises a cylinder 80 in which a piston 81 is slidable and which communicates with the governor unit 30 through the pipe 52. The piston 81 is connected by a journal and thrust bearing 82 to a sleeve 83 having external left and right hand screw threads 84 and 85 which are engaged respectively by projections 86 and 87 formed on rack members 88 and 89. The rack 90 of the rack member 88 meshes with a pinion 91 carried on a stub shaft extending through the casing of the pitch control unit to a chain wheel 92 coupled by cables 93 to the pitch control of the rotor 11. Similarly the rack 94 of the rack member 89 meshes with a pinion 95 mounted on a stub shaft carrying a chain wheel 96 coupled by cables 97 to the pitch control of the rotor 10. A construction of rotor hub especially adapted for use in this way is disclosed in my said Patent 2,330,842. The coil spring 98 is arranged to urge the piston 81 towards the left, as seen in Fig. 4, one end of the spring lying in a recess 99 in the back of the piston 81 while the other presses against a collar 100 formed on the elongated shank of a sprocket 101 which is mounted so as to be rotatable but not axially movable relatively to the casing of the pitch control unit. The shank of the sprocket 101 has a keyway 102 engaged by an inwardly projecting key 103 formed on the sleeve 83 which is thereby secured to the sprocket for rotational movement but which is capable of moving axially relatively thereto.

When fluid pressure is applied to the cylinder 80 through the pipe 52 from the governor unit, the piston 81 moves to the right, as seen in Fig. 4, carrying with it the sleeve 83 and rack members 88 and 89, thus causing rotation of the pinions 91 and 95 and hence of the chain wheels 92 and 96 in opposite directions. This is arranged to cause an increase of pitch in each of the rotors 10 and 11. Conversely when the speed of the power unit is reduced, the fluid pressure within the cylinder 80 is reduced by the action of the governor unit, allowing the piston 81 to move under the action of the spring 98 to reduce the pitches of both rotors causing a reduction in the torque which they absorb and tending to allow the speed of the power unit to return to normal. This normal speed of operation can be altered by use of the pilot's control coupled to the sprocket 71 for altering the equilibrium speed of the governor unit. Lateral control of the aircraft by altering the pitches of the rotors in opposite senses is provided by turning the sprocket 101, causing the sleeve 83 to turn and bringing into play the left and right handed screw threads 84 and 85 which cause movement of the rack members 88 and 89 in opposite directions resulting in an increase of the pitch of one rotor with a corresponding reduction in pitch of the other rotor.

Figure 5:
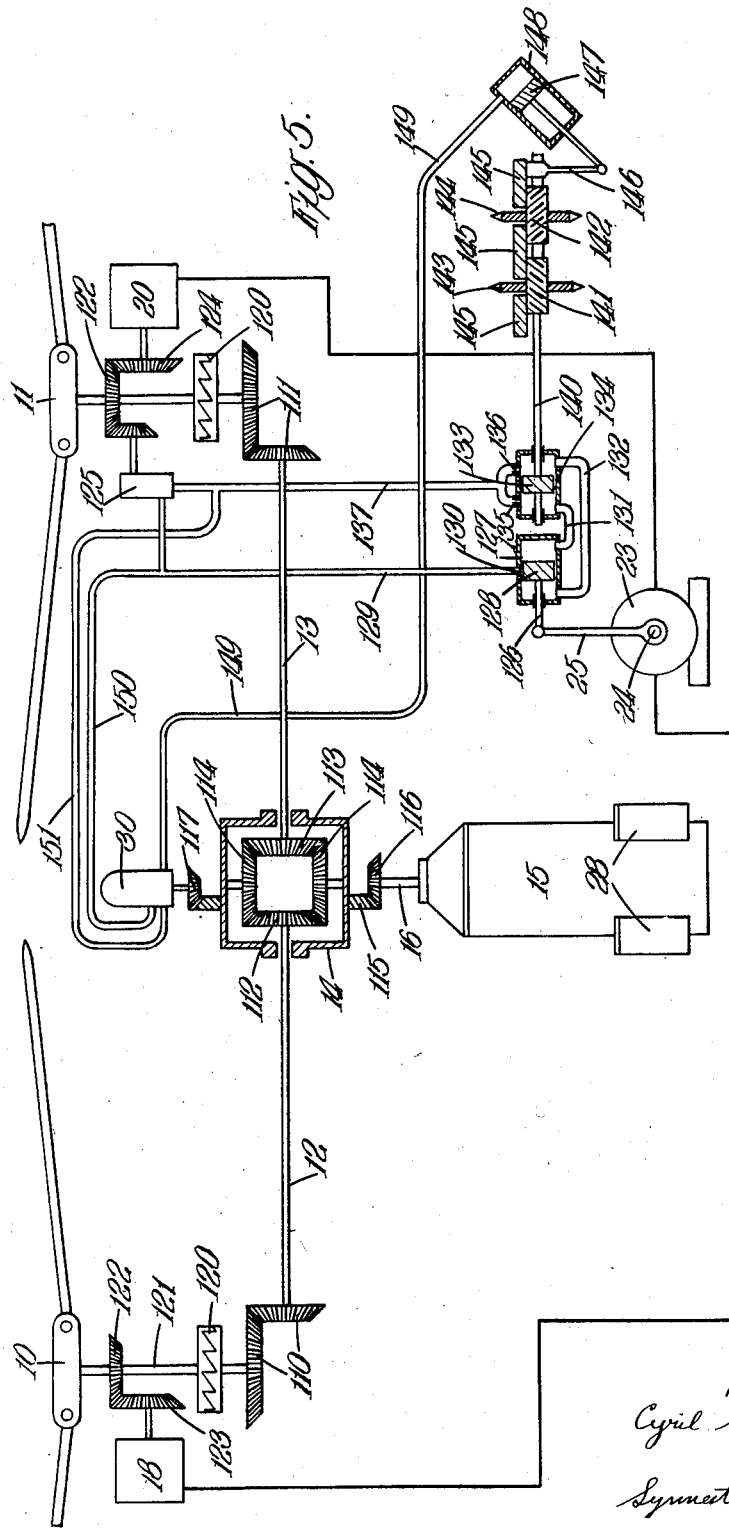
Figs. 5 and 6 are diagrammatic elevational views of a modified arrangement as applied to an aircraft having a pair of normally power driven rotors and in which the control system is arranged to alter the rotor pitches in opposite senses to maintain equality of their speeds.

Referring to Fig. 5: The rotors 10 and 11, during normal flight, are driven from shafts 12 and 13 through bevel drives 110 and 111 respectively. The shafts 12 and 13 have at their inner ends bevel wheels 112 and 113 meshing with wheels 114 journalled in the casing of the balance gear 14. A bevel wheel 115 integral with the casing is driven by a bevel pinion 116 mounted on the shaft 16 of the power unit 15. A governor unit 30 is also driven from the bevel wheel 115 by a pinion 117. The arrangement of the differential balance gear is such that during normal power driven flight the torque from the power unit is divided equally between the two rotors.

Each rotor has a freewheel clutch 120 which drives the hub through a shaft 121 carrying a bevel wheel 122. Bevel wheels 123 and 124 on the shafts of alternating current generators 18 and 20 are driven from the bevel wheels 122. Also driven from the bevel wheel 122 of the starboard rotor 11 is an oil pump 125. The outputs of the generators 18 and 20 are brought to the differential electrical unit 23 which is responsive to any difference between the outputs of the two generators. Mounted on the spindle 24 of the differential electrical unit 23 is an arm 25 pivotally connected to the rod 126 of a piston valve having a cylinder 127 in which a piston 128 is slidable. Fluid under pressure is supplied from the pump 125 through a pipe 129 to a port 130 in the wall of the cylinder 127 which is normally closed by the piston 128. Pipes 131 and 132 lead from the spaces at either side of the piston 128 to the spaces at opposite sides of a double acting relay piston 133 which is slidable in a relay cylinder 134. These spaces at either side of the relay piston 133 communicate through bleeder valves 135 and 136 with a pipe 137 leading back to the inlet side of the pump 125.

The relay piston 133 is mounted on a rod 140 which carries screw threaded bushes 141, 142 having opposite handed screw threads of equal pitch which are engaged by sprockets 143 and 144 respectively which are retained against axial displacement by abutments 145. Keyed to the end of the rod 140 is an arm 146 pivotally connected to the piston 147 of a second relay cylinder 148 which is connected to the governor unit 30 by a pipe 149.

Since the rotors 10 and 11 are driven through a differential balance gear 14 it is possible for their speeds to differ. The difference between the outputs of the generators 18 and 20 due to such a difference in rotor speed will result in turning of the spindle 24 of the differential electrical unit 23, thereby moving the arm 25 and piston 128, thus permitting the passage of pressure fluid from the pump 125 through the pipe 129 to one or other of the pipes 131 and 132 and thence to one side of the relay piston 133. The relay piston 133 moves in response to the fluid pressure bringing about axial movement of the rod 140 which carries with it the screw threaded bushes 141 and 142. This results in turning of the sprockets 143 and 144 since they are restrained against axial movement. The sprockets 143 and 144 are coupled to the pitch change mechanism (not illustrated) of the rotor hubs, which may be constructed as disclosed in my said Patent 2,330,842, so that axial movement of the rod 140 causes an increase of the pitch of that rotor which is rotating more quickly and a decrease of the pitch of the rotor which is running more slowly so tending to restore equality of rotor speeds. The governor unit 30 is responsive to the speed of the power unit and therefore to the mean speed of the rotors. Should this mean speed rise above the equilibrium speed of the governor unit, fluid under pressure from the pump 125 will be admitted through the pipe 150 to the governor unit and thence via the pipe 149 to the second relay cylinder 148, causing movement of the piston and rotation of the rod 140. Rotation of the rod 140 causes the sprockets 143 and 144 to turn in like directions resulting in an increase of the pitch of both rotors which therefore absorb more torque and tend to slow down. If the mean rotor speed drops below the equilibrium speed of the governor unit, fluid is returned from the second relay cylinder 148 through the pipe 149 to the governor unit 30 and thence via a pipe 151 to the low pressure side of the pump 125 resulting in a decrease in the pitches of both rotors.

Fig. 8 shows the control system of Fig. 5 as applied to a gyroplane, i. e. an aircraft in which the sustaining rotors operate autorotatively during flight. The arrangement is almost the same as that shown in Fig. 5 except that the rotor drive shafts 12 and 13 are driven through direct gearing 160 and a rotor starting clutch 161 from the shaft 16 of the power unit instead of being driven through a balance gear such as 14, the latter being unnecessary as, during flight, the rotors are coupled together only through the control system and not through the transmission. A further difference is that the governor unit 30 instead of being driven from the bevel wheel 115 on the casing of the balance gear 14 is driven by a bevel pinion 162 from the bevel wheel 122 on the shaft 121 of the rotor 10. The governor unit is therefore responsive to the speed of the rotor 10 and not to the mean of the rotor speeds. Moreover it continues to function to keep the rotor speed constant when the rotors are autorotating whereas in the arrangement shown in Fig. 5 it was arranged to connect the second relay cylinder 148 to the low pressure side of the pump 125 and so to reduce the pitches of the rotors from the value used when operating as a helicopter to a value permitting autorotation. In other respects the operation of the control system is as described with reference to Fig. 5.

Figure 6:
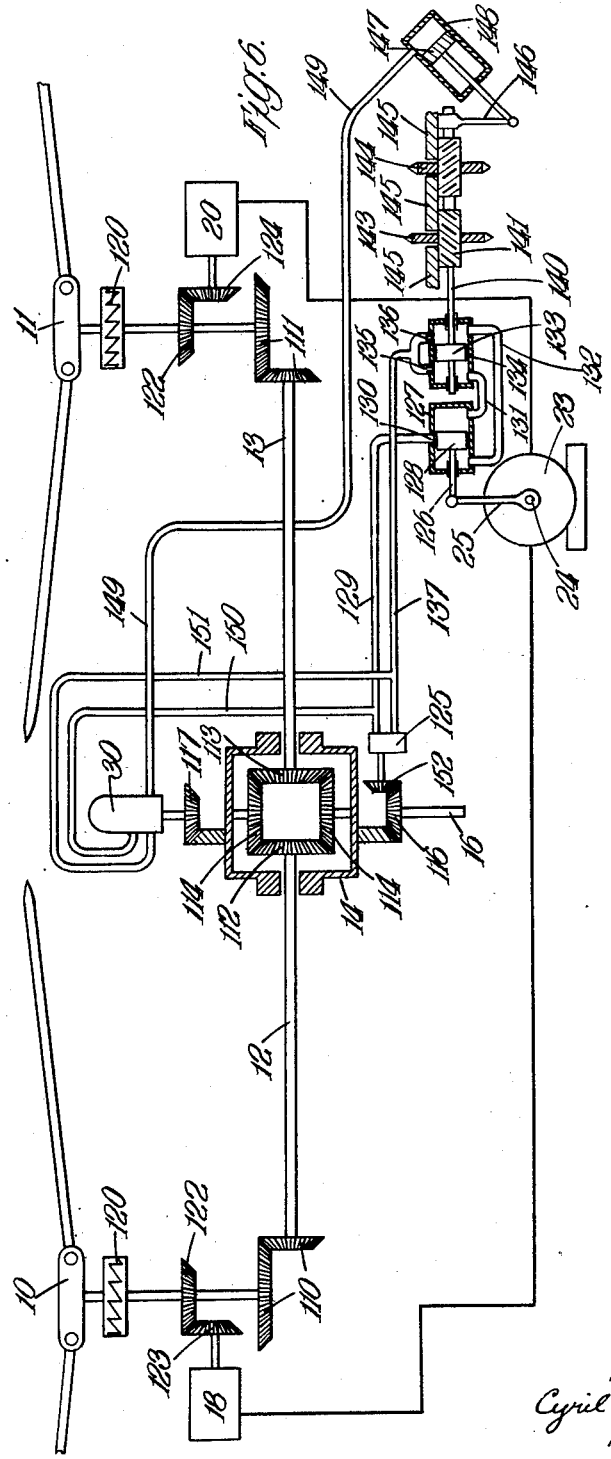

The arrangement shown in Fig. 6 is generally similar to that shown in Fig. 5 except that the generators 18 and 20 are geared to the drive instead of the driven side of the freewheels associated with the rotor hubs. This arrangement allows each rotor to take up its individual speed of rotation while it is overrunning the drive, for instance in the event of failure of the power unit, whereas with the arrangement illustrated in Fig. 5, the differential electrical unit 23 and associated relay mechanism is operative even when the rotors are autorotating. A further difference between the arrangement of Fig. 6 and that of Fig. 5 is that the pump 125 for supplying fluid under pressure for the relay systems is driven by a bevel wheel 152 from the bevel pinion 116 on the engine shaft instead of being driven from one of the rotors.

Fig. 7 shows this invention applied to an aircraft having a sustaining rotor 200 and a propulsive airscrew 201, the latter being offset from the longitudinal axis of the aircraft by an amount such that the torque reaction of the rotor during normal flight conditions is substantially counteracted by the thrust moment of the airscrew. The rotor and airscrew are driven through shafts 202 and 203 respectively from a balance gear 204 which may be of similar construction to the balance gear 14 illustrated in Figs. 5 and 6 and which is in turn driven from a power unit (not shown). Mounted on the rotor drive shaft 202 is a bevel pinion 205 meshing with a smaller pinion 206 driving an electrical generator 207. A bevel pinion 208 on the airscrew drive shaft 203 drives a larger bevel pinion 209 on the shaft of a second electrical generator 210. The ratios of the bevel gears 205, 206 and 208, 209 are chosen so that the speeds of the generators 207 and 210 are equal, thus allowing identical generators to be used. Alternatively if the two generators are not driven at the same speed they must be arranged to provide outputs of similar voltage and/or frequency when the airscrew and rotor are revolving at their normal speeds.

The outputs from the generators 207 and 210 are taken to a differential electrical unit 211 which has a spindle 212 carrying an arm 213 pivotally connected to a rod 214 which is coupled to a piston 215 and passes through a gland 216 in the cylinder 217 of a piston valve. A pipe 218 extends from the space at one side of the piston 215 to a relay cylinder 219 having a piston 220 joined to a rod 221 pivotally connected at its upper end to a lever 222, the opposite end of which is coupled by a link 223 to a pitch control (not illustrated) of the rotor 200. A pipe 225 extends from the space at the other side of the piston 215 of the piston valve to a second relay cylinder 226 having a piston 227 mounted on a rod 228 pivotally connected to a lever 229, the other end of which is coupled by a link to the pitch control (not illustrated) of the offset airscrew 201.

When the differential electrical unit 211 responds to a difference between the outputs of the generators 207 and 210, the piston 215 of the piston valve is moved, allowing fluid under pressure to pass from a pump 231 driven from the power unit to pass through a pipe 232 to one side or other of the piston 215 and thence via the pipe 218 to the relay cylinder 219 or via the pipe 225 to the relay cylinder 226 to cause an increase in the pitch of either the rotor or the airscrew in a sense tending to maintain a predetermined ratio between the speed of the rotor and that of the airscrew. The relay cylinders 219 and 226 are provided with bleeder valves 233 and 234 respectively joined by pipes 235 and 236 to the low pressure side of the pump 231. These bleeder valves allow the fluid pressure in the cylinders 219 and 226 to be reduced gradually to return the pitches of the rotor and airscrew to their normal values.

With the respect to the appended claims, it is to be noted that unless otherwise qualified, the term "rotor" as used in the claims is to be considered as comprehending sustaining rotors and propulsive and other airscrews.

What I claim is:

1. In an aircraft, a pair of sustaining rotors, a power unit, a power transmission from the power unit to each of the rotors, differential gearing in said transmission to ensure substantial equality of torque applied to the rotors during normal (power driven) flight, an electric generator driven from each rotor and means responsive to difference between the outputs of the said generators operative to maintain equality of speed of the rotors by controlled pitch change.

2. In an aircraft, a pair of sustaining rotors, a power unit, a power transmission from the power unit to each of the rotors, differential gearing in said transmission to ensure substantial equality of torque applied to the rotors during normal (power driven) flight, an alternating current electric generator driven from each rotor, a differential electrical unit responsive to difference between the outputs of the generators to maintain equality of speed of the rotors by controlled pitch change of said two rotors in opposite senses.

3. In an aircraft, a pair of sustaining rotors, an alternating current electric generator driven from each rotor, a differential electrical unit responsive to difference between the outputs of the generators, a source of fluid pressure, a relay cylinder having a piston operatively coupled to each of the rotors to produce pitch change in opposite senses and a valve actuated by the differential electrical unit for controlling the admission of pressure fluid from the source to the relay cylinder.

4. In an aircraft, a pair of sustaining rotors, a power unit, a power transmission from the power unit to each of the rotors, differential gearing in said transmission to ensure substantial equality of torque applied to the rotors during normal (power driven) flight, an alternating current electric generator driven from each rotor, a differential electrical unit responsive to difference between the outputs of the generators, a source of fluid pressure, a relay cylinder having a piston operatively coupled to each of the rotors to produce pitch change in opposite senses and a valve actuated by the differential electrical unit for controlling the admission of pressure fluid from the source to the relay cylinder.

5. In an aircraft, a pair of sustaining rotors, an alternating current electric generator driven from each rotor, a differential electrical unit responsive to difference between the outputs of the generators to maintain equality of speed of the rotors by controlled pitch change of said two rotors in opposite senses, and means responsive to the speed of one of the rotors operatively coupled to the rotors to produce pitch change in like senses tending to maintain constant rotor speed.

6. In an aircraft, a pair of sustaining rotors, a power unit, a power transmission from the power unit to each of the rotors, differential gearing in said transmission to ensure substantial equality of torque applied to the rotors during normal (power driven) flight, an alternating current electric generator driven from each rotor, a differential electrical unit responsive to difference between the outputs of the generators to maintain equality of speed of the rotors by controlled pitch change of said two rotors in opposite senses, and means responsive to the speed of the power transmission to the rotors operatively coupled to the rotors to produce pitch change in like senses tending to maintain constant rotor speed during power driven flight.

7. In an aircraft, a pair of sustaining rotors, a power unit, a power transmission from the power unit to each of the rotors, differential gearing in said transmission to ensure substantial equality of torque applied to the rotors during normal (power driven) flight, an alternating current electric generator driven from each rotor, a differential electrical unit responsive to difference between the outputs of the generators to maintain equality of speed of the rotors by controlled pitch change of said two rotors in opposite senses, and means responsive to the speed of the power transmission to the rotors operatively coupled to the rotors to produce pitch change in like senses tending to maintain constant rotor speed during power driven flight and to cause reduction of the pitches of the rotors to values within the autorotational range in the event of a failure of the power unit.

8. In an aircraft, a pair of sustaining rotors, a power unit, a power transmission from the power unit to each of the rotors, differential gearing in said transmission to ensure substantial equality of torque applied to the rotors during normal (power driven) flight, electric generators associated with each rotor, and means responsive to excessive difference between the outputs of the generators resulting from undesirable flight conditions operative to stop the power unit.

9. In an aircraft, a pair of sustaining rotors, a power unit having a magneto, a power transmission from the power unit to each of the rotors, differential gearing in said transmission to ensure substantial equality of torque applied to the rotors during normal (power driven) flight, an alternating current electric generator driven from each rotor and a differential electrical unit responsive to excessive difference between the outputs of the generators resulting from undesirable flight conditions operative to short circuit the low tension winding of the magneto so stopping the power unit.

10. In an aircraft, a sustaining rotor, a propulsive airscrew offset from the longitudinal axis of the aircraft, a power unit, a power transmission from the power unit to the rotor and to the airscrew, means included in said transmission for dividing the torque from the power unit in a given ratio between the rotor and the airscrew during normal (power driven) flight, electric generators driven from the rotor and from the airscrew and means responsive to difference between the outputs of the generators operative to maintain substantially constant the ratio of the speeds of the rotor and airscrew by controlled pitch change, the offset of the airscrew being such that the airscrew thrust moment substantially counteracts the rotor torque reaction.

11. In an aircraft, a sustaining rotor, a propulsive airscrew offset from the longitudinal axis of the aircraft, a power unit, a power transmission from the power unit to the rotor and to the airscrew, means included in said transmission for dividing the torque of the power unit in a given ratio between the rotor and the airscrew during normal (power driven) flight, alternating current electric generators driven from the rotor and from the airscrew, a differential electrical unit responsive to difference between the outputs of the generators operative during normal power driven flight to maintain substantially constant the ratio of the speeds of the rotor and airscrew by increase of the pitch of whichever is rotating too rapidly, the constructional offset of the airscrew being such that the airscrew thrust moment substantially counteracts the rotor torque reaction during straight flight.

12. In an aircraft, a sustaining rotor, a propulsive airscrew offset from the longitudinal axis of the aircraft, a power unit, a power transmission from the power unit to the rotor and to the airscrew, means included in said transmission for dividing the torque of the power unit in a given ratio between the rotor and the airscrew during normal (power driven) flight, identical alternating current generators driven through gearing from the rotor and from the airscrew, a differential electrical unit responsive to difference between the outputs of the generators, a source of fluid pressure, a relay cylinder having a piston operatively coupled to the rotor for pitch change, a second relay cylinder coupled to the airscrew for pitch change and a fluid pressure valve actuated by the differential electrical unit controlling the admission of pressure fluid to the relay cylinders selectively to maintain substantially constant the ratio of the speeds of the rotor and airscrew by increase of the pitch of whichever is rotating too rapidly, the constructional offset of the airscrew being such that the airscrew thrust moment substantially counteracts the rotor torque reaction during straight flight.

13. An aircraft having a pair of bladed rotors adapted to be driven and one of which is adapted to counteract the driving torque of the other, engine means for driving said rotors including controllable engine decelerating means, and governor mechanism connected with said controllable means and operative to decelerate the engine means upon substantial departure from a predetermined R. P. M. ratio between the two rotors.

14. A construction according to claim 13, wherein at least one of the rotors is a sustaining rotor which is constructed and arranged for autorotational overrunning operation upon deceleration of the engine means.

15. An aircraft having a pair of bladed rotors adapted to be driven and one of which is adapted to counteract the driving torque of the other, engine means for driving said rotors, power transmission means connecting the engine means with the rotors, the power transmission means for each rotor incorporating an overrunning clutch, and governor mechanism adapted to decelerate the engine means upon substantial change in relative R. P. M. of the two rotors beyond a predetermined range, the governor mechanism including for each rotor a control means actuated by the power transmission at a point beyond the overrunning clutch thereof.

16. An aircraft having a pair of variable pitch bladed rotors adapted to be driven and one of which is adapted to counteract the driving torque of the other, engine means for driving said rotors, power transmission means connecting the engine means with the rotors, the power transmission means for each rotor incorporating an overrunning clutch, governor mechanism adapted to decelerate the engine means upon substantial change in relative R. P. M. of the two rotors beyond a predetermined range, the governor mechanism including for each rotor a control means actuated by the power transmission at a point beyond the overrunning clutch thereof, and pitch control governor means actuated by the power transmission at a point ahead of the overrunning clutches of both rotors and providing for increase of mean blade pitch of both rotors upon increase of R. P. M. of the rotors and for decrease of mean blade pitch of both rotors upon decrease of R. P. M.

17. An aircraft having a pair of variable pitch bladed rotors adapted to be driven and one of which is adapted to counteract the driving torque of the other, engine means for driving said rotors, power transmission means incorporating differential gearing for dividing the torque between the rotors and further incorporating, for each rotor, an overrunning clutch disposed beyond the differential gearing, governor mechanism for control of blade pitch, the governor mechanism including, for each rotor, control means actuated by the rotor drive transmission for that rotor beyond the overrunning clutch therefor, and providing for inverse change in mean blade pitch of the two rotors in accordance with relative change in R. P. M. of the two rotors in a sense such that increase in relative R. P. M. of one rotor causes increase of mean blade pitch of that rotor and decrease of mean blade pitch of the other rotor, and additional pitch control governor means actuated by the power transmission ahead of the differential gearing and providing for increase of mean blade pitch of both rotors upon increase of rotor driving R. P. M. and decrease of mean blade pitch of both rotors upon decrease of rotor driving R. P. M.

18. An aircraft having a pair of variable pitch bladed rotors adapted to be driven and one of which is adapted to counteract the driving torque of the other, engine means for driving said rotors, power transmission means incorporating differential gearing for dividing the torque between the rotors and further incorporating, for each rotor, an overrunning clutch disposed beyond the differential gearing, and governor mechanism for control of blade pitch, the governor mechanism including, for each rotor, control means actuated by the rotor drive transmission for that rotor between the differential gearing and the overrunning clutch therefor, and providing for inverse change in mean blade pitch of the two rotors in accordance with relative change in R. P. M. of the two rotors in a sense such that increase in relative R. P. M. of one rotor causes increase of mean blade pitch of that rotor and decrease of mean blade pitch of the other rotor.

19. An aircraft in accordance with claim 18, and further incorporating additional pitch control governor means actuated by the power transmission ahead of the differential gearing and providing for increase of mean blade pitch of both rotors upon increase of rotor driving R. P. M. and decrease of mean pitch of both rotors upon decrease of rotor driving R. P. M.

20. An aircraft having a pair of variable pitch bladed rotors adapted to be driven and one of which is adapted to counteract the driving torque of the other, engine means for driving said rotors, power transmission means incorporating direct drive gearing for the two rotors and a disconnectible clutch ahead of said gearing and further incorporating for each rotor an overrunning clutch disposed beyond said gearing, and governor mechanism for control of blade pitch, the governor mechanism including for each rotor control means actuated by the rotor drive transmission for that rotor beyond the overrunning clutch therefor, and providing for inverse change in mean blade pitch of the two rotors in accordance with relative change in R. P. M. of the two rotors in a sense such that increase in relative R. P. M. of one rotor causes increase of mean blade pitch of that rotor and decrease of mean blade pitch of the other rotor.

21. An aircraft in accordance with claim 20, and further including additional pitch control governor means connected with one of the rotors beyond the overrunning clutch therefor and providing for increase of mean blade pitch of both rotors upon increase of rotor R. P. M. and decrease of mean pitch of both rotors upon decrease of rotor R. P. M.

22. In an aircraft having a pair of side-by-side sustaining rotors adapted to be driven in opposite directions during flight to mutually counteract rotor driving torque, engine means for driving the rotors, power transmission means between the engine means and the rotors, and a safety engine decelerating mechanism operative upon failure of the power transmission to one rotor to decelerate the engine means.

23. A construction in accordance with claim 22, and further incorporating for each rotor a freewheeling clutch permitting that rotor to overrun the rotor drive power transmission.

24. A construction in accordance with claim 22, wherein said safety mechanism includes for each rotor an alternating current generator driven thereby and a device associated with said generators and responsive to appreciable relative fluctuations in current frequency to decelerate the engine means.

25. In an aircraft having a pair of variable pitch side-by-side sustaining rotors adapted to be driven in opposite directions during flight to mutually counteract rotor driving torque, engine means for driving the rotors, power transmission means between the engine means and the rotors incorporating differential gearing for equalizing the torque between the rotors, and pitch control governor means for the rotors including for each rotor an alternating current generator operating therewith, and means associated with the generators and responsive to relative change in current frequency to inversely increase and decrease the mean pitch of the two rotors in accordance with variation in R. P. M. as between the two rotors in a sense such that relative increase of R. P. M. of one rotor causes increase of mean pitch of that rotor and decrease of mean pitch of the other rotor.

26. An aircraft having a variable pitch sustaining rotor generally centralized over the body of the craft and a variable pitch propulsive airscrew laterally offset from the longitudinal plane of symmetry of the craft toward that side on which the rotor blades advance into the flight wind during translational flight, engine means for driving the rotor and airscrew, power transmission means between the engine means and the rotor and airscrew, the offset of said airscrew and the characteristics of the rotor and airscrew being such that the thrust of said airscrew substantially counteracts the rotor driving torque in translational flight at normal cruising speed, and pitch control governor means for the rotor and the airscrew including for each an alternating current generator driven thereby and means associated with said generators and responsive to relative fluctuation in current frequency from a predetermined frequency relationship to inversely vary the mean pitch of the rotor and of the airscrew in accordance with variation of relative R. P. M. from a predetermined relationship in a sense providing for increase of rotor blade pitch upon relative increase of rotor R. P. M. and for decrease of airscrew pitch upon increase of rotor R. P. M.

27. In an aircraft, a sustaining rotor and a propulsive airscrew offset from the longitudinal axis of the aircraft, a power unit, a power transmission from the power unit to said rotor and said airscrew, a balance gear included in said power transmission for dividing the torque from the power unit equally between the rotor and airscrew, alternating current generators driven from the rotor and the airscrew respectively and means responsive to difference between the outputs of said generators operatively connected to the rotor and to the airscrew to effect pitch change tending to maintain substantially constant the ratio of the speeds of the rotor and airscrew during normal power driven flight.

28. In an aircraft, a sustaining rotor and a propulsive airscrew offset from the longitudinal axis of the aircraft, a power unit, a power transmission from the power unit to said rotor and said airscrew, a balance gear included in said power transmission for dividing the torque from the power unit equally between the rotor and the airscrew, alternating current generators driven from the rotor and the airscrew respectively, a differential electrical unit responsive to difference in the outputs of the generators, a source of fluid pressure, pitch control cylinders associated with the airscrew and with the rotor and a fluid pressure valve controlled by the differential electrical unit operative to control the admission of pressure fluid to the pitch control cylinders selectively to cause pitch change of the rotor or of the airscrew in a sense tending to maintain constant the ratio of the speeds of the rotor and airscrew by increasing the pitch of that which is rotating too rapidly.

29. An aircraft having a pair of bladed rotors adapted to be driven and one of which is adapted to counteract the driving torque of the other, engine means for driving said rotors, and governor mechanism adapted to decelerate the engine means upon substantial departure from a predetermined R. P. M. ratio between the two rotors, the governor mechanism including for each rotor an alternating current generator driven thereby and a device associated with said generators and responsive to appreciable relative fluctuations in current frequency to decelerate the engine means.

CYRIL GEORGE PULLIN.